United States Patent Office 3,527,800
Patented Sept. 8, 1970

3,527,800
SULFONYLCARBODIIMIDES
Adnan A. R. Sayigh, North Haven, and Henri Ulrich,
North Branford, Conn., assignors to The Upjohn Company, Kalamazoo, Mich., a corporation of Delaware
No Drawing. Filed Feb. 23, 1967, Ser. No. 617,836
Int. Cl. C07c 143/74, 143/78, 119/04
U.S. Cl. 260—556
6 Claims

ABSTRACT OF THE DISCLOSURE

Sulfonylcarbodiimides are produced by reacting a carbodiimide with a sulfonyl isocyanate. At an intermediate step in the reaction 2-imino-4-hydrocarbylsulfonylimino-1,3-oxazetidines and/or 4-imino-3-hydrocarbylsulfonyl-1,3,5-triazine-2,6-diones are produced. The latter two types of compounds are useful for the preparation of sulfonylcarbodiimides. Sulfonylcarbodiimides, in turn, are useful as stabilizers for polyesters.

BACKGROUND OF THE INVENTION

Several processes for the preparation of sulfonylcarbodiimides are known in the art. For example, a process reported by Ulrich and Sayigh, Agnew, Chem. Intern. ed. 3, 639 (1964), involves the reaction of a sulfonylthiourea with an acid halide. In another prior art process sulfonylthiourea is reacted with mercuric oxide, Neidlein et al., Tetrahedron Letters 2, 149 (1965), and in still another process an arylsulfonylisocyanide dichloride is reacted with an amine hydrochloride, Neidlein et al., Ibid 31, 2665 (1965).

The process of the present invention provides substantial advantages over the aforesaid prior art processes inasmuch as highly volatile by-products such as HCl, COCl$_2$, and the like, which result in a loss of vacuum during product separation steps and thereby present a danger of overheating, are not produced. Some of the by-products of prior art processes, such as HCl, for example, are also corrosive.

SUMMARY OF THE INVENTION

A carbodiimide of the type $R^2$—N=C=N—$R^3$ is reacted with a sulfonylisocyanate of the type $R^1SO_2NCO$ at a temperature in the range from about 100° C. to about 200° C. to produce a sulfonylcarbodiimide represented by the formula $R^1SO_2N$=C=N—$R^2$.

If the foregoing reaction is first carried out at a temperature in the range from about 20° C. up to, but not including 100° C., adducts represented by the formula

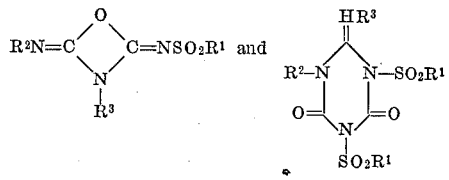

can be produced. These adducts can be subsequently pyrolyzed to the corresponding sulfonylcarbodiimides by heating at a temperature in the range from about 100° C. to about 200° C.

In the above formulas $R^1$ can be an alkyl, a cycloalkyl, an aryl, an alkaryl, a nitroaryl, or a haloaryl radical containing up to 18 carbon atoms, and $R^2$ and $R^3$ can be alkyl, cycloalkyl, aryl, alkaryl, nitroaryl, haloaryl, alkoxyaryl, or alkoxyalkyl radicals each containing up to 18 carbon atoms.

The process of this invention and the intermediates produced thereby are useful for the production of sulfonylcarbodiimides which, in turn, are useful as stabilizers for polyesters.

Detailed description

The instant process for the preparation of a N,N'-disubstituted sulfonylcarbodiimide which can be represented by the formula

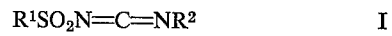

comprises the reaction of a carbodiimide represented by the formula

with a sulfonyl isocyanate represented by the formula

at a temperature in the range from about 100° C. to about 200° C., and preferably from about 140° C. to about 180° C. The reaction is dependent on the heating rate and the particular compounds involved, but usually time ranges from about 10 minutes to about 60 minutes. The preferred reaction time is 10 minutes to about 30 minutes.

In the foregoing Formulas I, II, and III, $R^1$ can be an alkyl, a cycloalkyl, an aryl, an alkaryl, a nitroaryl, or a haloaryl radical each containing up to 18 carbon atoms, and preferably from 1 to about 8 carbon atoms. $R^2$ and $R^3$ can be an alkyl, a cycloalkyl, an aryl, an alkaryl, a nitroaryl, a haloaryl, an alkoxyaryl, or an alkoxyalkyl radical each containing up to 18 carbon atoms, and preferably up to 8 carbon atoms.

Illustrative alkyl radicals are methyl, ethyl, the propyls, the butyls, the pentyls, the hexyls, the heptyls, the octyls, the decyls, the dodecyls, the octadecyls, and the like; illustrative cycloalkyl radicals are cyclopentyl, cyclohexyl, cycloheptyl, and the like; illustrative aryl radicals are phenyl, naphthyl, anthryl, and the like; illustrative alkaryl radicals are o-tolyl, m-tolyl, p-tolyl, 2,3-xylyl, 3,5-xylyl, mesityl, p-cumyl, 7-ethylnaphthyl, p-butylphenyl, and the like; illustrative nitroaryl radicals are o-nitrophenyl, m-nitrophenyl, p-nitrophenyl, 2,4-dinitrophenyl, 5-nitronaphthyl, and the like; illustrative haloaryl radicals are p-chlorophenyl, o-chlorophenyl, m-bromophenyl, 2,5-dichlorophenyl, 5-chloronaphthyl, 3,5-diiodophenyl, p-fluorophenyl, and the like; illustrative alkoxyaryl radicals are o-methoxyphenyl, p-ethoxyphenyl, 5-methoxynaphthyl, p-butoxyphenyl, 3,5-dimethoxyphenyl, and the like; and illustrative alkoxy radicals are methoxy, ethoxy, the propoxy, the butoxy, the pentyloxy, the hexyloxy, and the like.

The carbodiimides represented by Formula II, above, are known compounds many of which are commercially available. Other carbodiimides can be prepared in accordance with the teachings of Khorana, Chem. Rev. 53, 145, (1953).

Illustrative of the carbodiimides (II) suitable for the practice of the present invention are di-butylcarbodiimide, di-isopropylcarbodiimide, di-cyclohexylcarbodiimide, di-phenylcarbodiimide, di-o-tolylcarbodiimide, di-p-tolylcarbodiimide, di-p-nitrophenylcarbodiimide, di-p-chlorophenylcarbodiimide, di-o-methoxyphenylcarbodiimide, and the like.

Also suitable are carbodiimides (II) wherein the $R^2$ moieties are different. Typical of these are N-methyl-N'-tert.-butylcarbodiimide, N-methyl-N'-ethylcarbodiimide, N-propyl-N'-cyclohexylcarbodiimide, and the like.

The sulfonyl isocyanates represented by Formula III, above, are known compounds. The preparation of sulfonyl isocyanates is taught by Ulrich, Chem. Rev. 65, 369, (1965).

Illustrative of the sulfonyl isocyanates (III) suitable for the practice of the present invention are methanesulfonyl isocyanate, ethanesulfonyl isocyanate, propanesulfonyl isocyanate, butanesulfonyl isocyanate, benzenesulfonyl isocyanate, p-toluenesulfonyl isocyanate, p-chlorobenzenesulfonyl isocyanate, p-bromobenzenesulfonyl isocyanate, p-fluorobenzenesulfonyl isocyanate, 2,5-dichlorobenzenesulfonyl isocyanate, p-nitrobenzenesulfonyl isocyanate, and the like.

The reaction of the carbodiimide (II) with a sulfonyl isocyanate is believed to proceed according to the following equation:

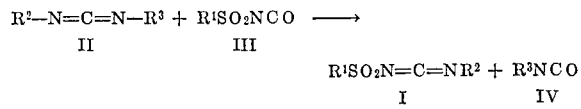

The reaction can be carried out under the aforesaid conditions with or without an inert solvent. A haloaromatic solvent such as chlorobenzene, o-dichlorobenzene, chloronaphthalene, or the like, is preferred, however. The choice of a suitable solvent is dictated primarily by its boiling point. It is desirable that the boiling point of the solvent is sufficiently high so that the reaction by-product (IV), i.e., the isocyanate $R^3NCO$, can be removed by codistillation with the solvent while at the same time the desired reaction temperature for the carbodiimide and the sulfonyl isocyanate reactants can be maintained. In this regard, it is particularly desirable to select the carbodiimide reactant so that the produced by-product isocyanate (IV) is the lowest boiling component in the obtained admixture of the reactants and the reaction products.

In an alternate embodiment of the process of this invention the carbodiimide (II) can be generated in situ from an organic isocyanate of the type $R^2NCO$, which carbodiimide is then further reacted with a sulfonyl isocyanate (III) to produce the sulfonyl carbodiimide (I). The carbodiimide (II) can be generated from the organic isocyanate in the presence of catalytic amounts of a suitable catalyst such as a phospholene oxide or a phospholene sulfide described in U.S. Pats. 2,840,589, 2,853,473, and 2,853,518 under substantially the same reaction conditions as above. Usually from about 0.1 to about 10 parts by weight of a catalyst per 100 parts by weight of the isocyanate are employed. The reaction is believed to proceed in two steps as follows:

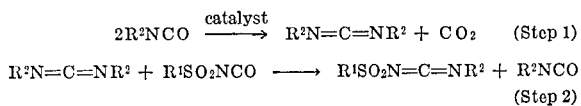

Illustrative of the catalysts that can be employed are 1-ethyl-3-methyl-3-phospholene 1-oxide, 1-phenyl-3-phospholene 1-oxide, 3-methyl-1-phenyl-3-phospholene 1-oxide, 1-ethyl-3-phospholene 1-oxide, 1-phenyl-3-phospholene 1-sulfide, 2-phenylisophosphindoline 2-oxide, and the like.

Other suitable catalysts are those disclosed in U.S. Pat. 3,056,835, that is, compounds which are (1) phosphates of the formula $(R^5O)_3PO$, (2) phosphates of the formula $(R^6O)_3PO$, (3) phosphonates of the formula $$(R^5O)_2P(O)R^7$$

(4) phosphoramides of the formula $[(R^5)_2N]_3PO$, (5) phosphonamides of the formula $[(R^5)_2N]_2P(O)R^6$, or (6) triarylamidophosphates of the formula $(R^7NH)_3PO$ wherein $R^5$ and $R^7$ can be alkyl groups of 1 to 19 carbon atoms, alkenyl groups of 2 to 12 carbon atoms, and haloalkyl groups of 1 to 12 carbon atoms, and wherein $R^6$ can be phenyl, (lower alkyl)phenyl, (lower alkoxy)phenyl, or halophenyl.

Still other catalysts that can be employed are the nonionic acetylacetone derivatives of metals of Groups II–A, III–B, IV–B of atomic numbers 40 to 72, V–B, VI–B, VII–B of atomic number 25, VIII, I–B of atomic number 29, III–A of atomic numbers 13 to 81, the lanthanide series of atomic numbers 58 to 71, and the actinide series of atomic numbers 89, 90, and 92, disclosed in U.S. Pat. 3,152,131. [The periodic table used in determining the above groupings is found in Lange, Handbook of Chemistry, 9th ed., pages 56–57 (1956)].

Another type of suitable catalysts is disclosed in U.S. Pat. 3,157,662 and can be represented by the formula

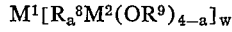

wherein $M^1$ can be an alkali or an alkaline earth metal, $M^2$ can be boron or aluminum, $R^8$ and $R^9$ are Zerewitinoff active hydrogen free alkyl groups, $w$ is the valence of $M^1$ and $a$ has a value from zero to two.

Still another grouping of suitable catalysts are those which promote the trimerization of free —NCO groups that are not sterically hindered. Such catalysts are disclosed and exemplified in British Pat. 930,036. Typical of such catalysts are tertiary amines, N-alkyl morpholines, N,N'-endo ethylene piperazine, tertiary amino ethers, pyridine, substituted pyridines, alkali metal hydroxides, alkali metal salts, sodium alcoholates, sodium acetoacetic ester, sodium phenolate, metal salts of carboxylic acids, non-basic organometallic compounds, and the like.

It has been also found that when substantially equimolar amounts of a carbodiimide (II) and a sulfonyl isocyanate (III) are admixed and maintained at a temperature, preferably in the range from about 20° C. to about 80° C., but not including 100° C., a 1:1 carbodiimide-sulfonylisocyanate adduct can be produced. An inert organic solvent can be employed optionally when dialkyl-, dicycloalkyl-, or dialkoxyalkylcarbodiimides are used as the starting materials. The produced 1:1 adduct is a 2-imino-4-hydrocarbylsulfonylimino - 1,3-oxazetidine represented by the formula

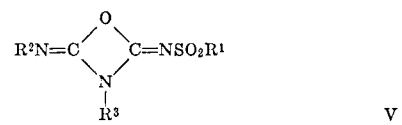

where $R^1$, $R^2$, and $R^3$ have the same meaning as before. The compounds represented by Formula V are stable indefinitely at room temperature and can be characterized by an infra red absorption band at about 5.80μ and at about 5.98μ, and by the absence of a cumulative double bond absorption band at about 4.49μ and about 4.7μ. In addition, when the substituents $R^2$ and $R^3$ comprise an aromatic nucleus, the aforedescribed 1,3-oxazetidines (V) can be dissociated, or reversed back, to the initial starting materials in a suitable aromatic solvent such as benzene, toluene, chlorobenzene, or the like.

Furthermore, when a carbodiimide (II) and a sulfonyl isocyanate (III) are reacted in a molar ratio of about 1:2, respectively, and in a manner whereby one of the reactants is first dissolved in a suitable inert solvent and the other reactant thereafter added to the resulting solution, a 1:2 carbodiimide-sulfonyl isocyanate adduct can be produced. The obtained 1:2 adduct is a 4-imino-3-hydrocarbylsulfonyl-1,3,5-triazine-2,6-dione represented by the formula

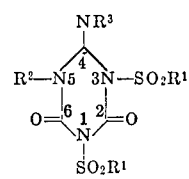

wherein $R^1$, $R^2$, and $R^3$ have the same meaning as above. The term "hydrocarbyl" as used herein is taken in its broader sense and contemplates radicals such as alkyl, cycloalkyl, aryl, alkaryl, and the like, including such radicals bearing monovalent substituents, e.g., nitro, halo, or the like, thereon. Also included within the term "hydrocarbyl" are radicals containing in the principal carbon chain hetero atoms such as oxygen, or the like, as exemplified by alkoxyaryl, alkoxyalkyl, and the like radicals.

The compounds represented by Formula VI are stable indefinitely at room temperature and can be characterized by an infra red absorption band at about 5.7µ, about 5.82µ, and about 5.98µ, and by the absence of a cumulative double bond absorption band at about 4.49µ and about 4.7µ.

The overall reaction sequence can be represented schematically as follows:

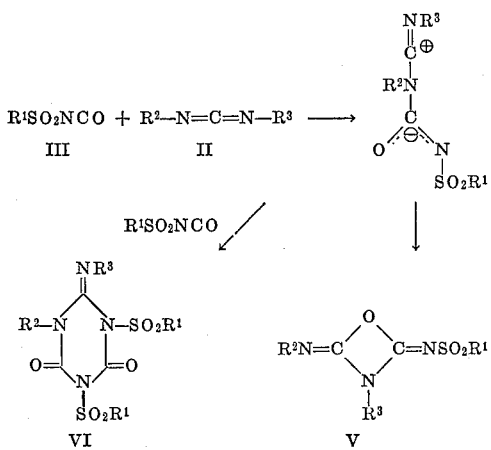

The methods of preparation for the 1:1 adducts (V) and the 1:2 adducts (VI) are not mutually exclusive. Commonly mixtures of the two types of adducts are prepared containing a relatively larger amount of one adduct and a relatively smaller amount of the other adduct, depending on the reaction conditions, reactant concentration, the nature of the reactant molecule, or the like. For example, when the nature of the molecule is such that intramolecular cycloaddition is slow because of steric hindrance, the 1:2 adduct formation is favored. The two types of adducts in a mixture of reaction products can be separated by conventional means, e.g., extraction, fractional distillation, chromatography, or the like.

Both types of adducts, i.e., those represented by Formula V and by Formula VI, can be subsequently pyrolyzed to an isocyanate of the type $R^2NCO$ and $R^3NCO$, and to the corresponding sulfonylcarbodiimide, i.e., $R^1SO_2N=C=NR^2$ or $R^1SO_2N=C=NR^3$, at a temperature in the range from about 100° C. to about 200° C., i.e., the adducts are prepared at a temperature not exceeding 100° C. and subsequently pyrolyzed.

Sulfonylcarbodiimides prepared in accordance with the present invention are useful as stabilizers for polyesters. Polyesters tend to deteriorate under heat and high humidity conditions as well as simple aging of the product. The elasticity and tear resistance of polyester products is reduced considerably thereby, but can be prevented by the addition of sulfonylcarbodiimides thereto.

While carbodiimides are generally useful as stabilizers to protect the polyesters against these undesirable characteristics (German Pat. 1,005,726; Belgian Pats. 612,040 and 618,389), the sulfonylcarbodiimides possess this stabilizing effect to a greater degree than the carbodiimides. The use of the sulfonylcarbodiimides for this purpose is particularly attractive since the sulfonylcarbodiimides are less susceptible to side reactions than the carbodiimides and thus can be used more effectively. In addition, the sulfonylcarbodiimides are colorless and less susceptible to discoloration than the carbodiimides.

Polyesters which can be effectively stabilized utilizing the sulfonylcarbodiimides include polyesters having the ester groups in the chain as well as polyesters having the ester groups pendant to the polymer chain.

Polyesters where the ester groups are in the chain include, for example, (a) Polyester polyurethanes derived by reacting at least one diol with at least one dicarboxylic acid under such conditions as to produce an essentially linear polyester diol having a molecular weight from about 500 to 5,000, preferably from about 1,000 to 3,000. In the preparation of the polyester, small amounts of reactants having a functionality greater than two can be tolerated but should not be present in amounts producing substantial branching. The diol and the acid may or may not contain olefinic bonds. The polyester is then reacted with a diisocyanate to produce a polyester polyurethane (Saunders and Frisch, Polyurethanes, Chemistry and Technology, Interscience, New York, 1961, pp. 44, 45, 314, 315, 323 and 324; Bjorksten, Polyesters and Their Applications, Reinhold, 1960, pp. 225–232, inclusive; Bayer Rubber Chemistry and Technology 23, 1950, 812; U.S. Pats. 2,625,531 and 2,625,532);

(b) Polyester polyurethanes derived by polymerization of lactones, more particularly epsilon caprolactones, which polymerizaiton is initiated by a suitable bi-functional initiator, such as a diol or an amino alcohol to obtain a polyester diol which is then reacted with a polyisocyanate (U.S. Pats. 2,933,477 and 2,933,478);

(c) Linear fiber forming polyesters such as polyethylene terephthalate and elastomeric terephthalates, the latter based on use of a mixture of an aliphatic acid with the terephthalic acid (Bjorksten, supra); and (d) Polyesters, usually unsaturated, cross-linked to a solid three dimensional network by a vinyl monomer, such as poly(ethylene maleate) diol having a molecular weight of about 2,000, mixed with styrene to form a liquid which is caused to polymerize to a solid resin by heating in the presence of benzoyl peroxide. Similar material can be used in combination with glass fibers to produce useful plastic materials (Bjorksten, supra, pp. 21–94, and Schildknecht, Vinyl and Related Polymers, John Wiley and Sons, Inc., New York, 1952, pp. 75–81).

Polyesters where the ester groups are pendant to the polymer chain include, e.g., (a) Polymers of vinyl esters of carboxylic acids and copolymers of these vinyl esters with at least one other vinyl monomer; a specific example of this is vinyl acetate and copolymers of vinyl acetate and ethylene (Schildknecht, supra, pp. 323–385 and 531–533, inclusive); and (b) Plastic and elastomeric high polymers of alpha, beta-unsaturated carboxylic acid esters and copolymers thereof with at least one other vinyl monomer; a specific example of this is poly(methylmethacrylate) and poly (methylacrylate) as plastics, and copolymers of methyl acrylate and butadiene as rubbers (Schildknecht, supra, pp. 179–255).

In utilizing the sulfonylcarbodiimides as stabilizing agents, it has been particularly advantageous to intimately mix from about 0.5 percent to about 5 percent by weight of the sulfonylcarbodiimide with the polyester. When the final polyester is cross-linked, it has also been found advantageous to add the sulfonylcarbodiimide prior to the cross-linking.

EXAMPLE I

*Stabilization of polyesters*

About 507 grams (1 equivalent) of hydroxyl polyethylene adipate, molecular weight 1014, hydroxyl number 110, and acid number 0.28, was melted in a one-liter resin flask and was stirred for about 4 to 5 hours at a pressure of about 3 to 4 mm. of Hg and at a temperature of about 100° to 120° C. The mixture was cooled to about 75° C. and about 88 grams (0.667 equivalent) of o-toluidine diisocyanate was added. The mixture was then heated to about 100° C. and maintained at said temperature for about one hour. Additional diisocyanate (about 123 grams, 0.934 equivalent) was then added and the obtained melt was heated to about 100° C. and maintained at this temperature for about one hour. The resulting prepolymer had a melting point of 30° to 35° C., a viscosity of about 13,000 cps. at 100° C., and an equivalent weight by titration with di-n-butylamine of 1197.

One hundred grams of the polymer was heated to about 125° C. and evacuated in a dessicator at about 2 to 3 mm. of Hg for about ten minutes to remove entrapped air. The polymer was then cooled to about 110° C. and about 3.5 grams of 1,4-butanediol (about 90 percent of the required stoichiometric amount) was added together with about 4 grams of N - methylsulfonyl - N' - n - propylcarbodiimide, mixed well for five minutes, and then poured into a well greased tray. The tray was covered and heated for about three hours at about 100° C. The obtained product was an elastomeric polyurethane melting at about 150° C.

The product was then subjected to 95 percent relative humidity atmosphere at about 70° C. for seven days after which time it was noted that the retention of tensile strength for the product was markedly greater than that of a sample which was the same except that it contained none of the N-methylsulfonyl-N'-propylcarbodiimide.

Some of the sulfonylcarbodiimides that can be prepared by the instant process are also valuable medicaments which are particularly suitable as active ingredients in blood sugar reducing compositions. In unit dosage form these compositions can be employed for the treatment of blood sugar disorders in mammals.

The sulfonylcarbodiimides suitable for the latter purpose can be represented by the formula

II

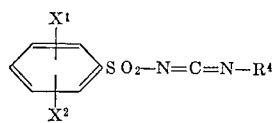

wherein $X^1$ and $X^2$ can be hydrogen, alkyl containing from 1 to about 4 carbon atoms, alkoxy containing from 1 to about 4 carbon atoms, or halo radicals, and wherein $R^4$ can be alkyl containing from about 2 to about 6 carbon atoms or cycloalkyl containing from about 5 to about 8 carbon atoms.

Similarly, the carbodiimide-sulfonyl isocyanate adducts are useful as stabilizers for improving the aging characteristics of polyester polyurethane and olefinic polymers. Particularly useful for this purpose are the adducts formed from diarylcarbodiimides and sulfonyl isocyanates which can be dissociated, or reversed, using a suitable solvent, as hereinbefore mentioned, to provide the starting diarylcarbodiimide as well as a sulfonyl isocyanate which can act as a water scavenger.

These adducts provide an important advantage because heretofore only those diarylcarbodiimides which are sterically hindered about the cumulative double bodn, such as di-o-tolylcarbodiimide, for example, could be employed as stabilizers because only such diarylcarbodiimides are storage stable. The diarylcarbodiimides which are not sterically hindered, such as diphenylcarbodiimide, for example, polymerize rapidly on standing at room temperature. Thus the aforementioned reversible adducts, which are stable at room temperature, provide an additional source of diarylcarbodiimides suitable as stabilizers, together with the added benefits derivable from the presence of the sulfonyl isocyanate.

Furthermore, all of the carbodiimide-sulfonyl isocyanate adducts within the purview of the present invention are useful as intermediates for the preparation of sulfonyl carbodiimides as hereinbefore set forth.

The present invention is further illustrated by the following examples:

EXAMPLE II

*Preparation of 1:1 dibutylcarbodiimide-p-toluenesulfonyl isocyanate adducts and the conversion thereof to N-p-toluenesulfonyl-N'-butylcarbodiimide*

Dibutylcarbodiimide (about 4.62 grams, 0.03 mole) was dissolved in benzene (about 30 milliliters) and p-toluenesulfonyl isocyanate (about 5.91 grams, 0.03 mole) was added dropwise and with stirring thereto at about room temperature. During the addition the temperature of the solution was observed to rise from about 27° C. to about 41° C.

The subsequent evaporation of the benzene afforded a quantitative yield of a liquid which was identified as 2-butylimino-3-butyl-4-p-toluenesulfonylimino - 1,3 - oxazetidine. Investigation of the infra red absorption characteristics in trichloromethane evidenced the complete disappearance of the NCO and N=C=N absorption bands and the formation of new absorption bands at $5.8\mu$, and $5.98\mu$, which evidence C=N band stretching vibrations.

Thereafter the liquid (about 10.5 grams, 0.03 mole) was heated under vacuum at a temperature in the range from about 150° C. to about 200° C. About 1.3 grams of butyl isocyanate was collected in Dry Ice trap and subsequent distillation of the obtained residue produced about 1.3 grams of a liquid boiling at about 159°–162° C. at about 0.2 mm. of Hg. This latter liquid was identified as N-p-toluenesulfonyl-N'-butylcarbodiimide, obtained in about 17.2 percent yield.

EXAMPLE III

*Preparation of 1:1 diisopropylcarbodiimide-p-toluenesulfonyl isocyanate adducts and the conversion thereof to N-p-toluenesulfonyl-N'-isopropylcarbodiimide*

Diisopropylcarbodiimide (about 12.6 grams, 0.1 mole) was dissolved in benzene (about 150 milliliters) and p-toluenesulfonyl isocyanate (about 19.7 grams, 0.1 mole) was added dropwise and with stirring thereto at a temperature of about 24°–32° C.

The subsequent evaporation of the benzene at about room temperature produced a quantitative yield of a solid material which was then triturated with methanol. About 17.75 grams of a crystalline product melting at about 130° to 135° C. was recovered. The product was identified as 2-isopropylimino-3-isopropyl-4-p-toluenesulfonylimino-1,3-oxazetidine, obtained in about 55 percent yield. Investigation of the infra red absorption characteristics in trichloromethane revealed absorption bands at $5.81\mu$ and $5.98\mu$ which evidence C=N bond stretching vibrations.

An aliquot of the crystalline product (about 6.46 grams, 0.02 mole) was dissolved in o-dichlorobenzene (about 35 milliliters) and slowly distilled over a Vigreux column while the temperature of the solution was maintained at about 180° C. About 18 milliliters of a distillate which was chiefly o-dichlorobenzene was collected. The distillate also contained isopropyl isocyanate and some isopropyl carbodiimide as evidenced by its infrared spectrum.

Thereafter all of the o-dichlorobenzene was removed from the solution under vacuum and the residue subjected to vacuum distillation. About 3.27 grams of a liquid boiling at about 168° C. at about 0.1 mm. of Hg and having a refractive index $n_D^{27}$ 1.5380 was obtained. The liquid was identified as N-p-toluene-sulfonyl-N'-isopropylcarbodiimide, obtained in about 69 percent yield based on the adduct.

A portion of the N-p-toluenesulfonyl-N'-isopropylcarbodiimide was then added to acetone containing a slight excess of water and was permitted to stand at about room temperature for about 40 hours after which time the acetone was removed by evaporation. The obtained residue was triturated with benzene and 1-p-toluene-sulfonyl-3-isopropyl urea melting at about 147°–148° C. was obtained. [Literature ref.: C.A. 52, 6248 (1958), M.P. 146° C.]

EXAMPLE IV

*Preparation of 1:1 dicyclohexylcarbodiimide-p-toluene-sulfonylisocyanate adducts and the conversion thereof to N-p-toluenesulfonyl-N'-cyclohexylcarbodiimide*

Dicyclohexylcarbodiimide (about 20.6 grams, 0.1 mole) was dissolved in benzene (about 120 milliliters) and p-toluenesudfonyl isocyanate (about 19.7 grams, 0.1 mole) was added thereto dropwise and with stirring at a temperature of about 25–35° C.

The subsequent evaporation of the benzene produced a crude, solid residue which was then triturated with methanol. About 21.65 grams of a crude product melting at about 160° to 176° C. was obtained. Trituration of the crude product with diethyl ether yielded a crystalline product melting at about 165° to 168° C. The product was identified as 2-cyclohexylimino-3-cyclohexyl-4-p-toluenesulfonylimino-1,3-oxazetidine, obtained in about 54 percent yield. Investigation of the infrared absorption characteristics in trichloromethane revealed absorption bands at $5.8\mu$ and $5.98\mu$ which evidence C=N bond stretching vibrations.

*Analysis.*—Calc'd for $C_{21}H_{29}N_3O_3S$ (percent): C, 62.53; H, 7.19; N, 10.42. Found (percent): C, 61.34; H, 7.03; N, 9.57.

An aliquot of the crystalline product (about 8.06 grams, 0.02 mole) was dissolved in 1-dichlorobenzene (about 50 milliliters), the resulting solution heated to reflux, and about 35 milliliters of o-dichlorobenzene removed from the solution by distillation over a Vigreux column. Thereafter all of the o-dichlorobenzene was removed from the solution under vacuum and the residue subjected to vacuum distillation. About 4.6 grams of a liquid boiling at about 203° to 206° C. at about 0.3 mm. of Hg and having a refractive index $N_D^{26}$ 1.5550 was obtained. The liquid was identified as N-p-toluenesulfonyl-N'-cyclohexylcarbodiimide, obtained in about 82.7 percent yield.

*Analysis.*—Calc'd for $C_{14}H_{18}N_2O_2S$ (percent): N, 10.04. Found (percent): N, 9.76.

A portion of the N-p-toluenesulfonyl-N'-cyclohexyl-carbodiimide was then added to acetone containing a slight excess of water and was permitted to stand at about room temperature for about 40 hours. Thereafter the acetone was removed by evaporation. The obtained residue was triturated with benzene and 1-p-toluenesulfonyl-3-cyclohexyl urea melting at about 174° to 175° C. was recovered. [literature ref.: C.A. 53, 1317 (1959); M.P. 182°–184° C.]

EXAMPLE V

*Preparation of 1:1 diphenylcarbodiimide-p-toluenesulfonyl isocyanate adducts and the conversion thereof to N-p-toluenesulfonyl-N'-phenylcarbodiimide*

Diphenylcarbodiimide (about 29.1 grams, 0.15 mole) was dissolved in benzene (about 60 milliliters) and p-toluenesulfonyl isocyanate (about 29.55 grams, 0.15 mole) was added dropwise thereto with stirring and at about 26° to 30° C.

The subsequent evaporation of benzene on a water bath produced a crystalline product melting at about 49° to 59° C.

The product was identified as 2-phenylimino-3-phenyl-4-p-toluenesulfonylimino-1,3-oxazetidine obtained in a quantitative yield. Investigation of the infrared absorption characteristics in a heavy parraffin oil revealed a double bond absorption band at $5.69\mu$ and the absence of absorption in the cumulative double bond region, which evidence adduct formation.

An aliquot of the crystalline product (about 11.73 grams, 0.03 mole) was dissolvel in o-dichlorobenzene (about 50 milliliters), the resulting solution heated to reflux, and the o-dichlorobenzene removed by distillation over a Vigreux column. The infrared spectrum of the distillate showed the characteristic phenyl isocyanate absorption at $4.40\mu$ (p-toluenesulfonyl isocyanate absorbs at $4.49\mu$). The distillation showed the sulfonylcarbodiimide band at $4.60\mu$.

Vacuum distillation of the residue produced about 1.2 grams of a mixture of carbodiimides boiling at about 164°–181° C. at about 0.2–0.3 mm. of Hg and having infrared absorption bands at $4.5\mu$, $4.6\mu$, and $4.7\mu$ which evidence the presence of di-p-toluenesulfonylcarbodiimide, N-p-toluenesulfonyl-N'-phenylcarbodiimide, and diphenylcarbodiimide, respectively.

EXAMPLE VI

*Preparation of N-p-tolylsulfonyl-N'-o-tolylcarbodiimide*

Di-o-tolylcarbodiimide (about 4.44 grams, 0.02 mole) and p-toluenesulfonyl isocyanate (about 4 grams, 0.02 mole) in o-dichlorobenzene (about 35 milliliters) was heated to reflux and about 30 milliliters of o-dichlorobenzene was removed from the resulting solution by distillation over a Vigreux column. The distillate was observed to contain o-tolyl isocyanate as evidenced by its characteristic infrared absorption band at $4.4\mu$.

Ligroine was added to the produced residue and a dark oil was observed to form. The dark oil was found to contain N-p-toluenesulfonyl-N'-o-tolylcarbodiimide as evidenced by a characteristic infrared absorption band of the latter at $4.6\mu$. Thereafter methanol was added to the dark oil and a reaction was observed to take place. As a reaction product 2-methyl-1-p-toluenesulfonyl-3-o-tolyl-isourea melting at about 141° to 143° C. was obtained. The isolation of the isourea clearly demonstrates that the corresponding sulfonylcarbodiimide, i.e., N-p-toluenesulfonyl-N'-tolylcarbodiimide was produced by the above procedure.

*Analysis.*—Calc'd for $C_{16}H_{18}N_2O_3S$ (percent): N, 8.76. Found (percent): N, 8.64.

EXAMPLE VII

*Preparation of dicyclohexylcarbodiimide-p-chlorobenzenesulfonyl isocyanate adducts*

Dicyclohexylcarbodiimide (about 20.6 grams, 0.1 mole) was dissolved in benzene (about 100 milliliters) anad p-chlorobenzenesulfonyl isocyanate (about 21.75 grams, 0.1 mole) was added thereto dropwise, rapidly, and with stirring at a temperature of about 28° to 40° C.

Thereafter the solvent was evaporated from the reaction mixture and the obtained residue was slurried in diethyl ether (about 100 milliliters). Upon filtration of the slurry about 9.6 grams of a solid material melting at about 147° to 150° C. was recovered. The material was identified as 1,3-di-p-chlorobenzenesulfonyl-4-cyclohexyl-imino-5-cyclohexyl-1,3,5-triazine-2,6-dione, obtained in 22.7 percent yield (based on carbodiimide).

*Analysis.*—Calc'd for $C_{27}H_{30}Cl_2N_4O_6S_2$ (percent: C, 50.55; H, 4.68; N, 8.74. Found (percent): C, 50.49, H, 5.11; N, 8.00.

A solid material was observed to precipitate from the filtrate upon standing. About 8.75 grams of a precipitate melting at about 160° to 164° C. was recovered. The precipitate was identified as 2-p-chlorobenzenesulfonyl-imino-4-cyclohexylimino - 3-cyclohexyl-1,3 - oxazetidine. Thereafter the filtrate was evaporated to dryness and about 21.6 grams additional of the same compound recovered. The overall yield of the 1:1 adduct was about 71 percent.

*Analysis.*—Calc'd for $C_{20}H_{26}ClN_3O_3S$ (percent): C, 56.67; H, 6.14; N, 9.92. Found (percent): C, 56.48; H, 6.31; N, 9.90

EXAMPLE VIII

*Method of preparing dicyclohexylcarbodiimide-p-chlorobenzenesulfonyl isocyanate adducts* p-Chlorobenzenesulfonyl isocyanate (about 21.75 grams, 0.1 mole) was dissolved in benzene (about 60 milliliters). To the resulting solution was added dicyclohexylcarbodiimide (about 10.3 grams, 0.05 mole) over a time period of about 4 minutes and at a temperature of about 26° to 38° C.

Thereafter the benzene was evaporated, and the obtained residue triturated with diethyl ether. About 18.5 grams of a solid material melting at about 150° to 153° C. was recovered. The material was identified as 1,3-di-p-chlorobenzenesulfonyl - 4 - cyclohexylimino-5-cyclohexyl-1,3,5-triazine-2,6-dione, obtained in about 57.8 percent yield, the same compound produced also in Example 7, above.

Evaporation of the diethyl ether produced about 12.6 grams of a residue enriched in 2-p-chlorobenzenesulfonyl-imino-4-cyclohexylimino-3-cyclohexyl-1,3-oxazetidine.

EXAMPLE IX

*Pyrolysis of a 1:2 adduct*

The 1,3-di-p-chlorobenzenesulfonyl-4-cyclohexylimino-5-cyclohexyl-1,3,5-triazine-2,6-dione prepared in Example 8, above is suspended in o-dichlorobenzene and maintained at about 180° C. for a relatively short time period, i.e., about 10 minutes. During heating the 1:2 adduct undergoes fragmentation to cyclohexylisocyanate, p-chlorobenzenesulfonyl isocyanate, and p-chlorobenesulfonylcyclohexylcarbodiimide, which fragments can be separated by fractional distillation.

EXAMPLE X

*Preparation of 1:2 adducts*

Diisopropylcarbodiimide (about 5.7 grams, 0.045 mole) was dissolved in benzene (about 50 milliliters) and p-chlorobenzenesulfonyl isocyanate (about 9.8 grams, 0.045 mole) added thereto over a time period of about 3 minutes at about 26° to 38° C.

Thereafter the benzene was evaporated and the residue triturated with diethyl ether. About 2.5 grams of a mixture of solids was obtained and was refluxed in carbon tetrachloride. About 0.85 grams of a solid material, insoluble in carbon tetrachloride, and melting at about 138° to 140° C., was recovered therefrom. The material was identified as 1,3 - di-p-chlorobenzenesulfonyl-4-isopropylimino - 5 - isopropyl-1,3,5-triazine-2,6-dione, obtained in about 3.35 percent yield (based on carbodiimide).

*Analysis.*—Calc'd for $C_{21}H_{22}Cl_2N_4O_6S_2$ (percent): C, 44.92; H, 3.92; N, 9.98. Found (percent): C, 45.40; H, 3.91; N, 10.32.

The diethyl ether employed in the aforementioned trituration was retained and permitted to stand at about room temperature. A precipitate was observed to form and was recovered therefrom by filtration. About 3.8 grams of a solid, melting at about 95° to 100° C., was obtained. The solid was identified as 2-p-chlorobenzene-sulfonylimino - 4-isopropylimino-3-isopropyl-1,3-oxazetidine, obtained in about 24.5 percent yield and the diethyl ether residue being predominantly the 1:1 adduct.

*Analysis.*—Calc'd for $C_{14}H_{18}ClN_3O_3S$ (percent): C, 48.91; H, 5.24; N, 12.23. Found (percent): C, 48.11; H, 4.75; N, 11.17.

EXAMPLE XI

*Preparation of a mixture of adducts and their separation* t-Butylmethylcarbodiimide (about 5.6 grams, 0.05 mole) was dissolved in benzene (about 100 milliliters). To the resulting solution was gradually added p-toluenesulfonyl isocyanate (about 9.85 grams, 0.05 mole) with stirring and at a temperature of about 25° to 32° C. The addition was carried out over a time period of about 2 minutes.

Thereafter the benzene was evaporated and the residue triturated with diethyl ether. About 5.5 grams of a crude solid material was recovered from the diethyl ether upon filtration. The crude solid material was further slurried in benzene and about 2.95 grams of a crystalline material melting at about 145° to 146° C. was obtained from the slurry. The crystalline material was identified as 1,3-di-p-toluene-sulfonyl-4-t-butylimino-5-methyl-1,3,5-triazine-2,6-dione, produced in about 12 percent yield (based on carbodiimide).

*Analysis.*—Calc'd for $C_{22}H_{26}N_4O_6S_2$ (percent): C, 52.17; H, 5.13; N, 11.07. Found (percent): C, 51.69; H, 5.28; N, 10.84.

The diethyl ether used in trituration was evaporated to dryness and about 1 gram of crystalline material identified as the 1:1 t-butylmethylcarbodiimide-p-toluenesulfonyl isocyanate adduct was obtained.

We claim:

1. A process for the preparation of a sulfonylcarbodiimide represented by the formula $$R^1SO_2N\!=\!C\!=\!NR^2$$

wherein $R^1$ is a member of the group consisting of alkyl, cycloalkyl, aryl, alkaryl, nitroaryl, and haloaryl, radicals each containing up to 18 carbon atoms, and $R^2$ is a member of the group consisting of alkyl, cycloalkyl, aryl, alkaryl, nitroaryl, haloaryl, alkoxyaryl, and alkoxyalkyl radicals each containing up to 18 carbon atoms which comprises reacting a carbodiimide represented by the formula $$R^2\!-\!N\!=\!C\!=\!N\!-\!R^3$$

with a sulfonyl isocyanate represented by the formula $$R^1SO_2NCO$$

$R^1$ and $R^2$ having the same meaning as above and $R^3$ being a member of the group consisting of alkyl, cycloalkyl, aryl, alkaryl, nitroaryl, haloaryl, alkoxyaryl, and alkoxyalkyl radicals each containing up to 18 carbon atoms at a temperature in the range from 100° C. to about 200° C. so as to produce the corresponding sulfonylcarbodiimide.

2. The process in accordance with claim 1 wherein the reaction is carried out at a temperature in the range from about 140° C. to about 180° C.

3. The process in accordance with claim 1 wherein the carbodiimide is selected so as to produce a by-product organic isocyanate of the type $R^2NCO$, $R^2$ having the same meaning as above, which is the lowest boiling component in the resulting admixture of reactants and the reaction products.

4. The process in accordance with claim 1 wherein the carbodiimide is generated in situ from a corresponding organic isocyanate in the presence of a suitable catalyst.

5. The process in accordance with claim 1 wherein the carbodiimide is reacted with the sulfonyl isocyanate in the presence of a haloaromatic solvent.

6. A process for the preparation of a sulfonylcarbodiimide represented by the formula $$R^1SO_2N\!=\!C\!=\!NR^3$$

wherein $R^1$ is a member of the group consisting of alkyl, cycloalkyl, aryl, alkaryl, nitroaryl, and haloaryl radicals each containing up to 18 carbon atoms and wherein $R^3$ is a member of the group consisting of alkyl, cycloalkyl, aryl, alkaryl, nitroaryl, haloaryl, alkoxyaryl, and alkoxyalkyl radicals each containing up to 18 carbon atoms, which comprises reacting a carbodiimide represented by the formula $$R^2\!-\!N\!=\!C\!=\!N\!-\!R^3$$

with a sulfonyl isocyanate represented by the formula $$R^1SO_2NCO$$

$R^1$ and $R^3$ having the same meaning as above and $R^2$ being a member of the group consisting of alkyl, cycloalkyl, aryl, alkaryl, nitroaryl, haloaryl, alkoxyaryl, and alkoxyalkyl radicals each containing up to 18 carbon atoms, at a temperature in the range from about 20° C. to about, but not including, 100° C. so as to form a carbodiimide-sulfonyl isocyanate adduct, and thereafter pyrolyzing the adduct at a temperature in the range from 100° C. to about 200° C. so as to produce the corresponding sulfonylcarbodiimide.

References Cited

UNITED STATES PATENTS 3,388,159   6/1968   Sayigh, et al. _____ 260—556

JOHN D. RANDOLPH, Primary Examiner

CECILIA M. SHURKO, Assistant Examiner

U.S. Cl. X.R.

260—45.9, 75, 86.7, 89.3, 239, 249.5, 397.7, 453, 545, 566, 858, 873; 424—321

UNITED STATES PATENT OFFICE
CERTIFICATE OF CORRECTION

Patent No. 3,527,800          Dated November 2, 1970

Inventor(s) Adnan A. R. Sayigh and Henri Ulrich

It is certified that error appears in the above-identified patent and that said Letters Patent are hereby corrected as shown below:

Column 1, line 66, for " radical con-" read -- radical each con- --. Column 6, line 21, for " 45, 314," read -- 45, 313, 314, --. Column 7, line 63, for "bodn" read -- bond --. Column 9, line 13, for "toluenesudfonyl" read -- toluene-sulfonyl --. Column 10, line 7, for "distillation showed" read -- distillation residue showed --. Column 10, line 39, for " N'-tolylcarbodimide" read -- N'-o-tolylcarbodiimide --. Column 10, line 50, for "anad" read -- and --.

SIGNED AND
SEALED
DEC 29 1970

(SEAL)
Attest:

Edward M. Fletcher, Jr.
Attesting Officer

WILLIAM E. SCHUYLER, JR.
Commissioner of Patents